Sept. 11, 1962     A. D. BROWN, JR     3,054,109
BALANCED HYDROSTATIC INKING SYSTEM
Filed March 20, 1961
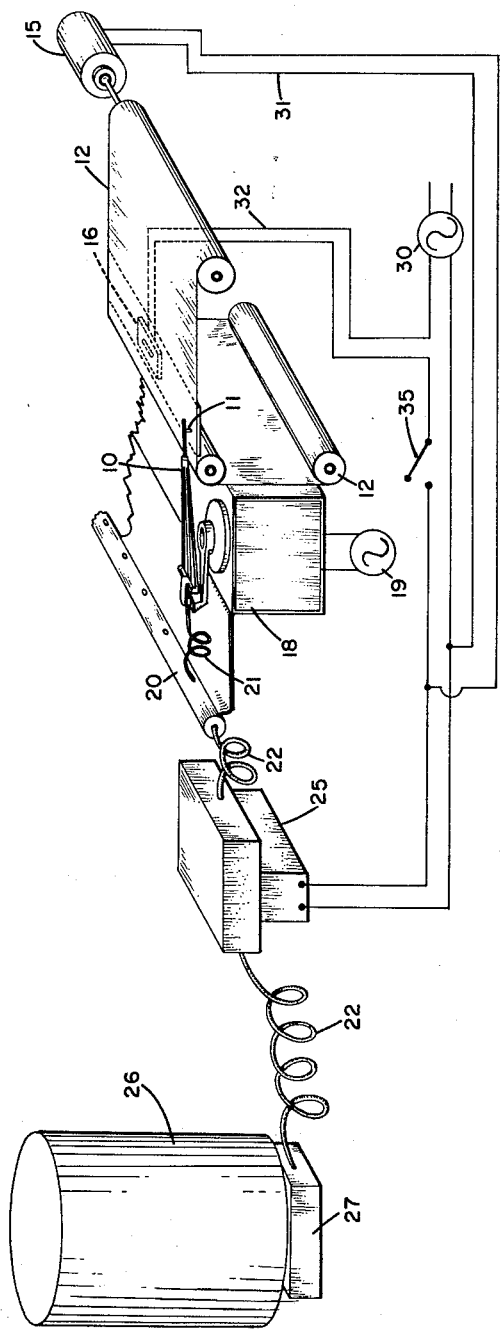
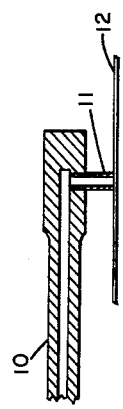
INVENTOR.
ARLING DIX BROWN JR.
BY
ATTORNEY United States Patent Office 3,054,109
Patented Sept. 11, 1962

3,054,109
BALANCED HYDROSTATIC INKING SYSTEM
Arling Dix Brown, Jr., Cleveland Heights, Ohio, assignor to Clevite Corporation, a corporation of Ohio
Filed Mar. 20, 1961, Ser. No. 96,814
9 Claims. (Cl. 346—117)

This invention pertains to a writing system, particularly of the type used for oscillographic pen recorders or the like, though it is not limited thereto.

In the past the usual pen recorder of the oscillographic type used a liquid ink to write on a moving paper chart. This system had many advantages over electric writing and photographic systems in that it was relatively inexpensive and was instantaneous. However, it for years has suffered from many disadvantages. These disadvantages were sufficiently great that for many applications electric writing is used in spite of the high cost of the record medium; photographic devices are employed even though the film is expensive and has to be developed over a period of time; special ultraviolet recorders are used; and chemical recorders are used with heat; and straight heat recorders are used.

The chief disadvantages of the inking system as it was heretofore known have been due to the liquid ink which was used. This liquid ink had to dry quickly after it was applied to the moving record medium because otherwise it would smear as the paper was rolled up and the operator would often touch the wet ink causing loss of accuracy of the record, unsightly records, etc. The quick drying quality which was so highly desirable when the ink was applied to the chart paper was a tremendous disadvantage when the pen recorder was not used for a while, as it caused clogging of the small hole in the tip of the pen and consequently the pen often would not write when the instrument was first started. Systems were employed to force the ink out of the pen tip to clear the passageway so that the capillary forces involved in the pen and in the tube connecting the liquid ink supply to the pen would thereafter supply adequate ink for writing on the moving paper.

Another disadvantage inherent in the liquid ink system is that the rapidly oscillating pen tip would often throw drops of ink around the room. Also, with a liquid ink system the pen recorder must be operated in the one position for which it was designed, if designed for flat operation it cannot be turned upside down or sideways because the ink spills out.

The system of the present invention is an inking mechanism, having all the advantages of the previous liquid ink systems in that it is relatively inexpensive and is instantaneous, and in addition the new system obviates the disadvantages inherent in the liquid ink systems.

It is an object of the present invention to provide a writing system, especially for pen recorders or oscillographs, wherein the ink supply to the pen is independent of gravitational forces whereby the device will operate in any position and will operate under severe acceleration forces; and wherein the device is substantially independent of temperature and altitude effects.

Another object of the invention is to provide a pen recorder device which will not throw ink when the pen is moving at high speed.

Still another object of the invention is to provide a pen recorder device wherein the ink will not dry and clog the pen.

It is also an object of the invention to provide an inking system wherein the ink is positively delivered to the tip of the pen, virtually independent of capillary forces, and virtually independent of centrifugal forces on the pen tip, whereby the quantity of ink delivered to the pen tip is, in effect, metered in accordance with the amount of ink deposited on the moving record medium, and consequently there is no ink thrown off of the pen in the form of drops.

A further object of the invention is to provide a pressurized ink feed system for a pen recorder or writing system, wherein the pressure is exerted on the ink only while there is a supply of record medium available on which to write, and only while the record material is being driven past the recording pen.

For a better understanding of the present invention, together with other and further objects thereof, reference is had to the following description taken in connection with the accompanying drawings, and its scope will be pointed out in the appended claims.

FIGURE 1 is a schematic diagram showing the mechanical and electrical components of the balanced hydrostatic writing system of the invention, and FIGURE 2 is a greatly enlarged sectional view showing the tip of the pen on the record medium.

With reference to the drawing there is shown in FIGURE 1 a diagrammatic view of the balanced hydrostatic inking system which is the subject matter of the present invention.

The new system uses viscous ink compared to the prior art fluid ink which was fed through the supply tube and through the inking pen by capillary attraction, and the highly viscous ink is forced through the system by pressure.

Pressurized ball point pens have been known. The present system does not employ a ball point pen. In the present device the tip of the pen is a hollow tube and is biased against the record medium with a certain force which is correlated to the pressure on the fluid, and is correlated with the viscosity of the ink and the inherent resistances to the flow of the viscous material. These forces establish a balanced hydrostatic system which feeds an adequate amount of the viscous ink to the pen tip, yet does not force excess amounts of the ink out of the pen in normal operation.

When the tip of the tubular pen is against the record medium it forms a seal therewith which is maintained throughout the writing operations. It is highly important that the entire periphery of the tip of the pen engage the surface of the record medium, and it is important that at least the surface of the record medium be able to absorb the viscous ink. True absorption probably is not essential, as it has been found that plastic materials, such as Mylar, acetate, and polystyrene having an etched surface to give them a matte finish, have an apparent or effective "absorption" which satisfactorily accepts the viscous ink. Papers which are satisfactory have a clay coating or a gloss finish. "Kromekote" made by Champion Paper and Fibre Company makes a good trace but its reproducibility is slightly inferior to that of "Trycite" which is made by Dow Chemical Company. The important cooperative operation between the viscous ink, the pen tip, and the surface of the record member, is that as the pen tip rests against the apparently absorptive surface of the record material and relative motion takes place between the pen tip and the paper, the viscous ink penetrates the absorptive surface of the paper and is sheared off by the wall of the pen, leaving an excellent trace on the surface of the record member which "dries" almost instantly, i.e., in about .25 to 1 second. The ink is very similar to ball point pen ink in that it is a dye dissolved in glycol, there being about 50% dye which means that a modest amount of the ink will last a very long time compared to the substantially non-viscous liquid inks which are fed by capillary attraction through the pen. The viscosity of the ink which is satisfactory for the present system is such that capillary attraction cannot feed to the pen adequate amounts for high speed operation; inks with viscosities in the range between 50 to 10,000 centipoises have been successfully used, but the range 100–1000 centipoises appears to be best when used with the optimum pressure range of about 3 to 20 pounds per square inch.

The best pen tip has been found to be a stainless steel tube whose outside diameter is about .018″ and whose wall thickness is about .003″ to .004″. A biasing force toward the paper of about 25 grams should be applied to the pen tip, thus sealing the periphery of the pen against fluid pressure in the ink. Pressure on the viscous ink should be between about 3 p.s.i. and 100 p.s.i., but the most satisfactory range has been found to be 3–20 p.s.i. This is adequate to make the system completely independent of position or of the head of ink. Thus the device will write satisfactorily even though it is tilted on its side or even upside down. Also, the system becomes almost insensitive to acceleration forces, opening up many more fields of use. While stainless steel appears to make the best pen tip other materials such as glass, nylon and sapphire have been satisfactorily used. Paper, of course, is somewhat abrasive, but the viscous ink as it is sheared off by the pen tip apparently lubricates the tip and it is probable that the tip might not even touch the paper, leading to a very long life for the pen tip. The thickness of the film of ink remaining on the record medium after writing has been found on Kromekote to be about .000017″, but if the instrument writes over the trace again and again it does not add appreciably to the thickness of the film or to the darkness of the trace. This is an advantage in the field of oscillographic pen recorders where the pen tip often moves so fast as to retrace its path many times in a fraction of a second. Prior art systems using liquid ink would under these circumstances deposit large quantities of ink on the paper, leaving a puddle which often spattered and which soaked into the paper. Due to the very thin trace formed by the present system and due to the high dye content of the ink which permits the thin trace to be easily visible, 2 ounces of the ink will give a trace about 260 miles long.

With reference to the drawing there is shown in FIGURE 1 an oscillographic pen recorder system comprised of one or more inking pens 10 each having a tubular tip 11 formed of stainless steel or the like, with the tip 11 forming a seal with the record medium 12 which may be paper or plastic, as has previously been discussed.

The record member 12 is driven past the tip 11 of the pen 10 by a motor 15, and a microswitch 16 is positioned under the paper 12 where it is engaged and held closed by the paper. When the supply of paper is exhausted, switch 16 opens and releases the pressure on the ink feed system, as will be explained in connection with the electrical circuit.

The pen 10 is actuated by a pen motor 18 which receives its electrical signal from a source 19, as is known to the art. Ink is supplied from a manifold 20 through flexible tube 21, and is supplied to the manifold 20 through flexible tube 22. In the tube 22 there is a solenoid operated shut-off valve 25 which normally is closed. The ink supply is contained in a can 26 which has a check valve and pressure regulator 27 at its lower end, the can 26 being connected to the shut-off valve 25 by the tube 22. The ink within the can 26 is maintained under pressure by gas therein, or the pressure may be established or maintained by a pump or by a spring loaded piston. If a gas pressurized can is used the ink should be in the bottom thereof, or the can should have an internal diaphragm separating the gas from the ink so that it will feed all of the ink out of the can independent of the position of the can.

The electrical circuit for the system includes a power supply 30, a circuit 31 to the motor 15 for driving the paper 12, a circuit 32 to the microswitch 16 and a circuit 33 to the solenoid actuated shut-off valve 25. An operator actuated switch 35 is located in the circuit so that when it is closed and the microswitch 16 is closed, the valve 25 is energized and opens to apply pressure from container 26 through the system to the pen tip 11, and the paper advancing motor 15 starts. When switch 35 is opened the motor stops and valve 25 closes, shutting off the pressure from the supply 26. When this happens, pressure in the manifold 20 and in the tube 21 and pen 10 drops to a modest value due to resilience in the tubes 21. Due to the location of the microswitch 16, if the supply of record medium becomes exhausted, the circuit opens stopping motor 15 and closing the valve 25.

While the previous description particularly refers to an inking system for an oscillograph the invention is not limited thereto. The principles involved therein have been tried in an inking system particularly adapted to a drafting mechanism and excellent results were obtained. Nor is the invention limited to pens with very small diameter tubular pens. Larger tubes may be used, the important factor being that the viscosity of the ink, the pressure on the system and the seal between the pen tip and the record medium be such that when the system is writing it will be hydrostatically balanced and as the ink is carried away on the record member a fresh supply of ink is continuously forced against the surface of the paper.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A balanced hydrostatic writing system comprising: a record medium whose surface at least is effectively absorbent, a pen having a tubular tip section whose entire periphery is against the surface of said record medium forming a seal therewith during writing operations, viscous ink within said pen, pressure means connected to said pen for applying pressure to said viscous ink during a writing operation to force said ink through the tip of said pen and against the surface of said record medium to cause said ink apparently to be absorbed in the surface of said record medium, and means biasing said tubular pen against said record medium with sufficient force that the pressure established in said ink by said pressure means acting against said record medium is insufficient to break the effective seal between the record medium and the pen tip; the ink, upon relative motion between the record medium and the pen tip, shearing to leave portions thereof absorbed in the surface of the record medium and to lubricate the periphery of the pen tip against the abrasive action of the record medium.

2. A balanced hydrostatic writing system for writing on a record medium whose surface at least is absorbent, comprising: a pen having a tubular tip section whose entire periphery is against the surface of said record medium forming a seal therewith during writing operations, viscous ink within said pen, pressure means connected to said pen for applying pressure to said viscous ink during a writing operation to force said ink through the tip of said pen and against the surface of said record medium to cause said ink to be absorbed in the surface of said record medium, and means biasing said tubular pen against said record medium with sufficient force that the pressure established in said ink by said pressure means acting against said record medium is insufficient to break the effective seal between the record medium and the pen tip; the ink, upon relative motion between the record medium and the pen tip, shearing to leave portions thereof absorbed in the surface of the record medium and to lubricate the periphery of the pen tip against the abrasive action of the record medium.

3. A balanced hydrostatic writing system for writing on a record medium whose surface at least is absorbent, comprising: a pen having a tubular tip whose entire periphery can be placed against the surface of said record medium effectively forming a seal therewith, a supply of viscous ink connected to said tubular pen tip, pressure means establishing pressure behind said viscous ink during a writing operation to force said viscous ink through said tubular pen and against the surface of said record member where it is absorbed, and bias means biasing the tip of said pen against said record medium with sufficient force that the pressure of said ink at the pen tip established by said pressure means is insufficient to break the effective seal between the record medium and the pen tip.

4. A balanced hydrostatic writing system for writing on a record medium whose surface at least is absorbent, comprising: a pen having a tubular tip whose entire periphery can be placed against the surface of said record medium effectively forming a seal therewith, a supply tube connected to said pen, a supply of viscous ink connected to said supply tube and including a container, means for pressurizing said container to force said viscous ink through said supply tube to said pen tip and against said record medium during writing operations, and bias means biasing the tip of said pen against said record medium with sufficient force that the ink pressure is insufficient to break said effective seal.

5. A balanced hydrostatic ink writing system for a pen writing on a moving strip of record medium, comprising a pen having a tubular tip whose entire periphery is effectively sealed against the surface of the record medium during a writing operation, drive means for driving the strip of record medium, means for moving said pen tip across said record medium during a recording operation, a supply of viscous ink connected to said pen, pressure means for applying pressure to said ink during a writing operation to force said viscous ink out of said pen tip and against said record medium, and bias means biasing the tip of said pen against said record medium with sufficient force that the ink pressure is insufficient to break said effective seal.

6. A writing system as set forth in claim 5, further characterized by motor control means connected to said pressure means to substantially terminate said pressure when said drive means is not driving said record medium.

7. A writing system as set forth in claim 5, further characterized by record medium control means connected to said pressure means to substantially terminate said pressure when the supply of record medium is exhausted.

8. A writing system as set forth in claim 7, further characterized by motor control means connected to said pressure means to substantially terminate said pressure when said drive means is not driving said record medium.

9. A writing system as set forth in claim 8, further characterized by said control means comprising a normally closed valve located between said pen and said supply of pressurized viscous ink, said valve being opened by said medium control means and by said motor control means only when there is a supply of the record medium in the system and when the record medium is being driven past said pen tip.

No references cited.